United States Patent [19]
Kurita et al.

[11] Patent Number: 5,920,568
[45] Date of Patent: Jul. 6, 1999

[54] SCHEDULING APPARATUS AND SCHEDULING METHOD

[75] Inventors: Toshihiko Kurita; Ichiro Iida, both of Kanagawa, Japan

[73] Assignee: Fujitsu Limited, Kanagwa, Japan

[21] Appl. No.: 08/790,443

[22] Filed: Jan. 29, 1997

[30] Foreign Application Priority Data

Jun. 17, 1996 [JP] Japan ..................................... 8-155746

[51] Int. Cl.[6] .............................. H04L 12/28; H04L 12/56
[52] U.S. Cl. ........................... 370/412; 370/411; 370/429
[58] Field of Search .......................... 370/414, 416–418, 370/395, 468, 229, 335, 351, 428, 429, 411, 412

[56] References Cited

U.S. PATENT DOCUMENTS

| | | | |
|---|---|---|---|
| 5,231,633 | 7/1993 | Hluchyj et al. | 370/94 |
| 5,268,900 | 12/1993 | Hluchyj et al. | 370/94 |
| 5,499,238 | 3/1996 | Shon | 370/411 |

Primary Examiner—Chi H. Pham
Assistant Examiner—Afsar M. Qureshi
Attorney, Agent, or Firm—Helfgott & Karas, P.C.

[57] ABSTRACT

A scheduling apparatus and a scheduling method are capable of reading data elements from a plurality of queues in such a form that past hysteresis reflects therein. The scheduling apparatus comprises a queue hysteresis table for storing a value e_count obtained subtracting the number of data elements (packets in a router) actually fetched out of the queue, from the number of times with which this queue becomes a processing target with respect to each queue. The apparatus also comprises a scheduling unit for cyclically designating each queue as a processing target, adding "1" to e_count, corresponding to that queue, in the queue hysteresis table if no data elements exist in the queue designated as the processing target, consecutively fetching, from the processing target queue, the data elements the number of which corresponds to a value of e_count corresponding to the queue if the data elements exist in the processing target queue, and decrementing the value of e_count by the number of fetched data elements.

10 Claims, 13 Drawing Sheets

FIG. 2

| Version | IHL | Type of Service | Fragment Length | |
|---|---|---|---|---|
| Packet ID | | | Flag | Fragment Offset |
| TTL | | Protocol ID | Header Checksum | |
| Source IP Address | | | | |
| Destination IP Address | | | | |
| Options | | | Padding | |
| DATA | | | | |
| DATA | | | | |

FIG. 3

| QUEUE ID | ACTIVE FLAG a_flag | EMPTY COUNT NUMBER e_count |
|---|---|---|
| 1 | 1 | 3 |
| 2 | 0 | 0 |
| ⋮ | ⋮ | ⋮ |
| N | 1 | 0 |

FIG. 8

| QUEUE ID | ACTIVE FLAG a_flag | EMPTY COUNT NUMBER e_count | $C_1$ | $C_2$ |
|---|---|---|---|---|
| 1 | 1 | 3 | 2 | 1 |
| 2 | 0 | 0 | 0 | 0 |
|  |  |  |  |  |
| N | 1 | 1 | 0 | 1 |

FIG. 10

| QUEUE ID | ACTIVE FLAG a_flag | SIZE DATA S |
|---|---|---|
| 1 | 1 | 3 |
| 2 | 0 | 0 |
| ... | ... | ... |
| N | 1 | 0 |

TIME

SCHEDULING APPARATUS AND SCHEDULING METHOD

BACKGROUND OF THE INVENTION

1. Field of the Invention

The present invention relates generally to a scheduling apparatus and a scheduling method for fetching information elements out of a plurality of ques for storing inputted information elements and more particularly to a scheduling apparatus and a scheduling method that are used for, e.g., routers.

2. Related Background Art

There exists a data structure, known as a queue, for transferring and receiving data between two processes each having a different speed. The queue is defined as a data structure consisting of a plurality of data elements. The data elements thereof are fetched based on constraints of FIFO (First In First Out). The queues have been used in a variety of apparatuses, and one of techniques making use of the plurality of queues is called a fair queuing method.

Herein, with reference to FIGS. 13, 14, the fair queuing method will be discussed by exemplifying a router for connecting two subnets A, B to each other as illustrated in FIG. 12.

As shown in FIG. 13, a router 50 using the fair queuing method includes a packet classifying unit 51, a plurality of queues 52, an output buffer 53 and a scheduling unit 55. Each queue 52 is provided corresponding to a transmitting station (terminal) connected to the subnet A, and the packet classifying unit 41 supplies packets transmitted from a given transmitting terminal, to the queue corresponding to this transmitting terminal.

The scheduling unit 55 goes on cyclically specifying the respective queues 52 and, if the queue 52 designated as a processing target is stored with a packet, fetches the packet from this queue 32 and further supplies an output buffer 53 with the packet. That is, the scheduling unit 55, as schematically shown in FIG. 14, cyclically designates the queues $52_1$–$52_3$ as processing targets and, if the packets exist in the queue 52 designated as the processing target, fetches one packet out of this queue.

Thus, according to the fair queuing method, an opportunity for fetching the data elements (packets) is cyclically given to the plurality of queues.

Known also is a router that performs the above-described queue control in consideration of a packet size. In this type of router, the processing target queues are cyclically changed, and there is judged whether each queue designated as the processing target is stored with the packets. Then, if stored with the packets, the size data corresponding to that queue is incremented by one bit, and the packet is fetched out of such a queue that the size data is coincident with the packet size.

According to the router involving use of the fair queuing method described above, the opportunity for transmitting the packets can be given more impartially to the respective transmitting terminals than by the prior art router (for transferring the packets based on the FIFO system) for determining a packet transmitting sequence without considering the transmitting terminals.

In the router using the fair queuing method, however, if no packets exist in a certain queue (transmitting terminal) when the packet transmitting opportunity is given to this queue, this fact does not reflect in processes for the packet transmitting opportunities after the next time onward. Therefore, in the case of observing it at a long time interval, it follows that partial processing is executed for each of the transmitting terminals. Further, the packet fetching from the relevant queue is executed alternately with the packet fetching from other queue (or confirmation of status of other queue). Hence, even if a certain transmitting terminal generates the packets burstwise, the packets transmitted by the router in response thereto are spoiled in terms of their burstwise properties.

SUMMARY OF THE INVENTION

Accordingly, it is a primary object of the present invention to provide a novel scheduling apparatus and a novel scheduling method that are suitable for use with routers and contrived to read data elements from a plurality of queues in such a form that past hysteresis reflects therein.

To accomplish the above object, according to one aspect of the present invention, a scheduling apparatus fetches data elements from a plurality of queues for storing inputted data elements. The scheduling apparatus comprises a storing unit for storing read-out number data defined as data for determining an upper limit of the number of the data elements that are read extra from the queue with respect to each of the plurality of queues. The scheduling apparatus also comprises a designating unit for cyclically designating one of the plurality of queues as a processing target, and a judging unit for judging whether or not the queue designated by the designating unit is stored with the data elements. The scheduling unit further comprises an adding unit for adding "1" to the read-out number data, corresponding to the queue designated by the designating unit, in the storing unit when the judging unit judges that the queue is not stored with the data elements, and a data element fetching unit for fetching one piece of data element from the queue designated by the designating unit when the judging unit judges that the queue is stored with the data elements, judging whether or not the read-out number data corresponding to this queue is above 1, and, when the read-out number data is over 1, fetching from the queue the data elements an upper limit number of which is the read-out number data, and further subtracting the number of the fetched data elements from the read-out number data corresponding to that queue.

That is, the first scheduling apparatus cyclically designates each queue as a processing target while setting, in the read-out number data for each queue, a value obtained by subtracting the number of data elements actually fetched out of the queue, from the number of times with which the relevant queue becomes the processing target. Then, when the queue designated as the processing target is stored with the plurality of data elements, the data elements the number of which corresponds to a value of the read-out number data, i.e., the number of times with which the data element is not fetched, are consecutively fetched from that queue.

Thus, in the first scheduling apparatus, the data elements are fetched in such a form as to take the past hysteresis into consideration, and therefore it follows that each queue (a process or a device for inputting the data to each queue) is treated more impartially than ever before. Further, if the first scheduling apparatus is applied to the router, the packets can be communicated without any decline in the burstwise property.

The first scheduling apparatus may employ the adding unit for adding "1" to the read-out number data as far as the read-out number data takes a value less than a predetermined value. With the construction as it is, it is possible to prevent a large quantity of data elements from being consecutively fetched out of the single queue.

Moreover, the first scheduling apparatus may further comprise a counting unit for counting the number of queues stored with no data elements when the designating unit designates a predetermined queue as a processing target, and a controlling unit for controlling the data element fetching unit so that a sum of the numbers of data elements fetched extract from the respective queues till the predetermined queue is again designated by the designating unit, does not exceed a count value by the counting unit. In the case of the scheduling apparatus being constructed as described above, a maximum value of time needed till the data elements are taken from within the queue does not depend on the number of data elements in other queues.

Furthermore, the first scheduling apparatus may adopt the storing unit for storing an empty count number used for determining an initial value for the read-out number data with respect to each queue, and the adding unit for adding "1" respectively to the empty count number and the read-out number data, corresponding to the queue designated by the designating unit, in the storing unit. There may be also added a setting unit for setting a value of the corresponding empty count number in each piece of read-out number data within the storing unit with a predetermined period and setting "0" in each of the empty count numbers. The scheduling apparatus being thus constructed, the past hysteresis does not reflect in the processing contents more than required.

A second scheduling apparatus according to the present invention fetches data elements from a plurality of queues for storing inputted data elements. This scheduling apparatus comprises a storing unit for storing size data with respect to each of the plurality of queues, a designating unit for cyclically designating one of the plurality of queues as a processing target. The scheduling apparatus may also comprise an adding unit for adding a specified value to the size data, corresponding to that queue, in the storing unit if the queue designated by the designating unit is not stored in its head with the data element having a size under the size data, corresponding to the queue, in the storing unit. The scheduling apparatus may further comprise a data element fetching unit for, if the queue designated by the designating unit is stored in its head with the data element having the size under the size data corresponding to that queue, fetching the same data element, and repeating a process of subtracting a size of the fetched data element from the size data corresponding to that queue till the data elements having the size under the size data come to non-existence in the head of that queue.

That is, the second scheduling apparatus performs the same control as that of the first scheduling apparatus in such a form as to take the size of each data element into consideration.

The second scheduling apparatus may involve the use of the adding unit for adding the specified value to the read-out number data as far as the size data takes a value less than a predetermined value. Added further to the second scheduling apparatus is a controlling unit for controlling the data element fetching unit so that a sum of sizes of the data elements fetched after one piece of data element from one queue does not exceed a predetermined value. With the scheduling apparatus thus constructed, the maximum value of the time needed till the data elements are fetched out of each queue does not depend upon a quantity of the data elements in other queues.

Moreover, the scheduling apparatus may adopt the storing unit for storing second size data used for determining an initial value for the size data with respect to each queue, and the adding unit for adding a specified value respectively to the second size data and the size data, corresponding to the queue designated by the designating unit, in the storing unit. Added also to the scheduling apparatus is a setting unit for setting a value of the corresponding second size data in each piece of size data within the storing unit with a predetermined period and setting "0" in each piece of the second size data. When the scheduling apparatus is thus constructed, it is feasible to prevent the old hysteresis from reflecting in the processing contents more than needed.

A scheduling method according to the present invention is a method of fetching data elements from a plurality of queues for storing inputted data elements. This scheduling method comprises a step of cyclically designating one of the plurality of queues as a processing target, and a step of adding "1" to read-out number data corresponding to that queue if the relevant queue is not stored with the data elements with respect to each queue designated as the processing target. The scheduling method also comprises a step of fetching one piece of data element from the relevant queue if this queue is stored with the data elements, a step of judging whether or not the read-out number data of the relevant queue is over "1", a step of further fetching, from the relevant queue, the read-out number data an upper limit number of which is the read-out number data, and a step of subtracting the number of the fetched data elements from the read-out number data.

A second method according to the present invention is a method of fetching data elements from a plurality of queues for storing inputted data elements. This scheduling method comprises a step of cyclically designating one of the plurality of queues as a processing target, a step of adding a specified value to size data corresponding to the relevant queue if the head of this queue is not stored with the data elements having a size under size data corresponding to that queue with respect to each queue designated as the processing target, and a step of fetching, if the data element having the size under the size data corresponding to the relevant queue is stored in the head of that queue, this piece of data element. The second scheduling method also comprises a step of repeating a process of subtracting a size of the fetched data element from the size data corresponding to the relevant queue till the data element having the size under the size data comes to non-existence in the head of the relevant queue.

BRIEF DESCRIPTION OF THE DRAWINGS

FIG. 2 is an explanatory diagram showing an outline of a packet transferred by the router in the first embodiment;

FIG. 3 is an explanatory diagram showing an outline of a queue hysteresis table incorporated into the router in the first embodiment;

FIG. 8 is an explanatory diagram showing an outline of the queue hysteresis table incorporated into the router in a second embodiment;

FIG. 10 is an explanatory diagram showing an outline of the queue hysteresis table incorporated into the router in a third embodiment;

DESCRIPTION OF THE PREFERRED EMBODIMENTS

The present invention will hereinafter be specifically described with reference to the accompanying drawings.

First Embodiment

Figure 1:
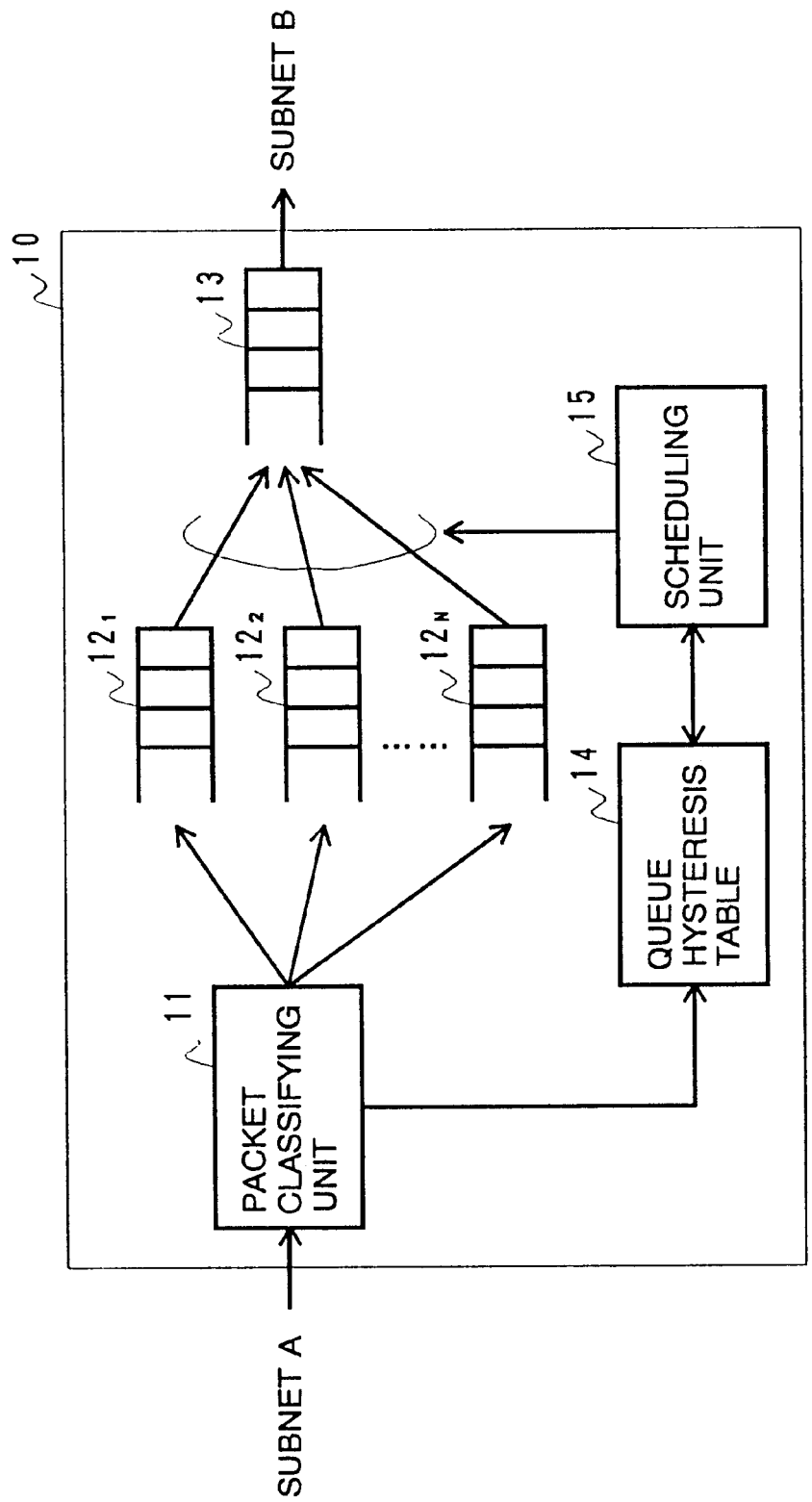
FIG. 1 is a block diagram showing functions of a router in a first embodiment of the present invention.

FIG. 1 illustrates an outline of a configuration of a router to which a scheduling method (and a scheduling apparatus) of the present invention is applied. A router 10 in a first embodiment is an apparatus for connecting a subnet A to a subnet B, and includes, as shown in FIG. 1, a packet classifying unit 11, queues $12_1$–$12_N$, and output buffer 13, a queue hysteresis table 14 and a scheduling unit 15. Note that, the router 10 is constructed so that some queues 12 are created in a memory dynamically in accordance with a receiving condition of packets. Therefore, queues $12_1$–$12_N$ are not always exist in the router 10. Although in this embodiment, assuming, for the sake of convenience, that the router 10 is provided with N queues 12 which functions independently, the configuration and operation will be discussed first. Thereafter, real configuration and operation of the router 10 will be discussed.

The queues $12_1$–$12_N$ are buffers for temporarily storing packets that should be transmitted to the subnet B, and are each made corresponding to transmitting stations (terminals) connected to the subnet A. The packet classifying unit 11 supplies the queues 12 corresponding to transmitting addresses contained in those packets with packets received from the subnet A. Note that the router 10 in this embodiment is constructed so as to transfer packets (so-called internet packet) each having a structure shown in FIG. 2. Hence, the packet classifying unit 11 specifies a queue 12 to store the received packet by reading the transmitting terminal address (transmitting terminal IP address) included in the header of the received packet.

Further, the packet classifying unit 11 executes a process of rewriting contents of the queue hysteresis table 14 (the details of which will be stated later on) in parallel to the above-described supplying process of the packets. The output buffer 13 is temporarily stored with the packets within the respective queues 12, and the packets in the output buffer 13 are transmitted in the as-inputted sequence to the subnet B.

The queue hysteresis table 14 is a table the contents of which are updated by the packet classifying unit 11 and the scheduling unit 15. As illustrated in FIG. 3, the queue hysteresis table 14 is stored with active flags (a_flag) and empty count numbers (e_count) in such a form that these flags and numbers are made corresponding to queue IDs defined as data for identifying the queues.

Figure 4:
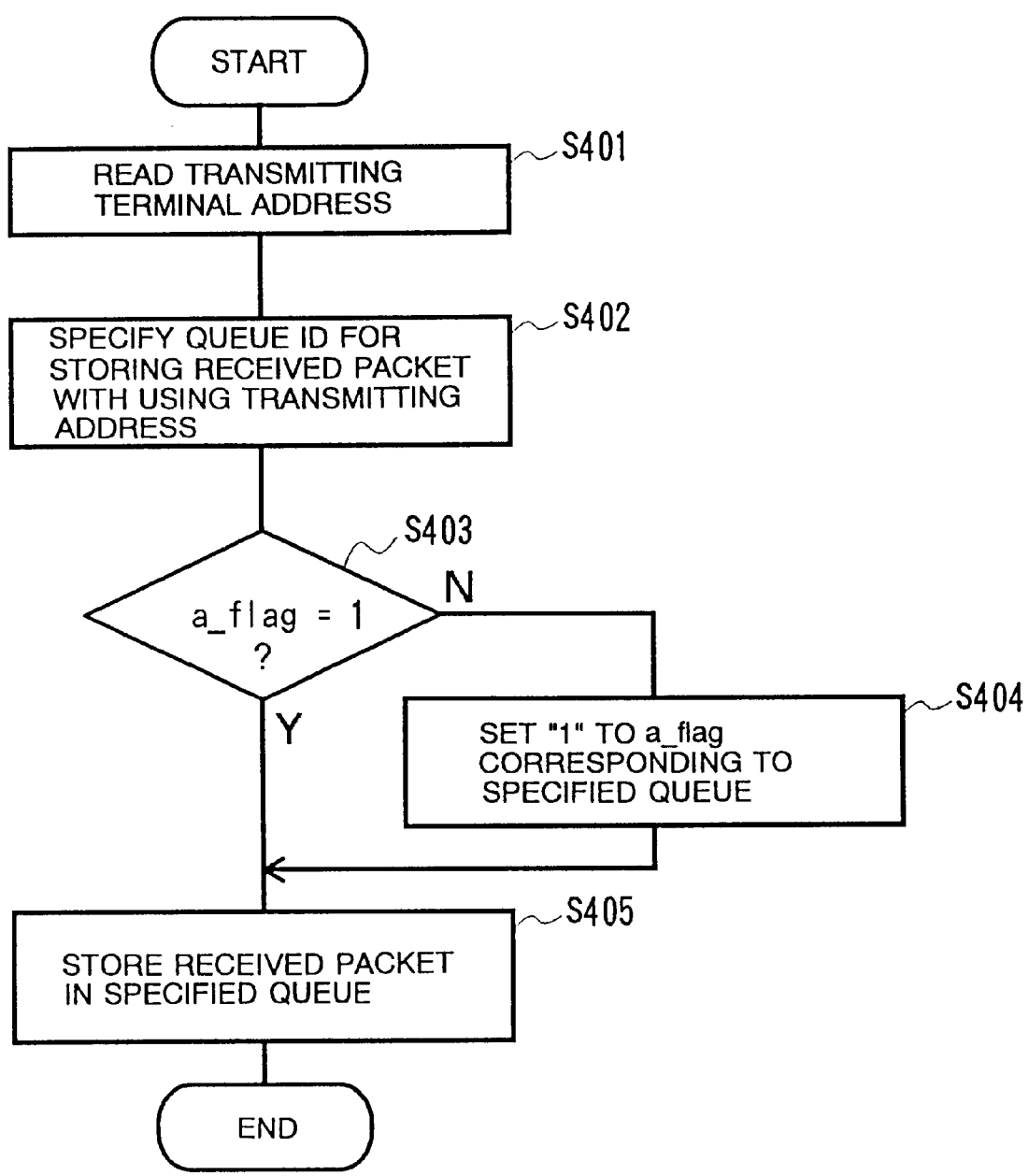
FIG. 4 is a flowchart showing operation procedures of a packet classifying unit provided in the router in the first embodiment.

The packet classifying unit 11 rewrites values of the active flags a_flag within the queue hysteresis table 14 in accordance with a packet receiving condition. More specifically, when receiving a packet, the packet classifying unit 11 reads, as shown in FIG. 4, a transmitting terminal address included in the header of the received packet first (step S401). Next, the packet classifying unit 11 specifies a queue ID for storing the received packet by referring to a address-queue ID table which holds the relationship between the transmitting terminal addresses and the queue IDs, and is provided inside the unit (step S402). Thereafter, the packet classifying unit 11 checks the value of the active flag corresponding to the specified queue ID in the queue hysteresis table 14 (step S403).

When the value of the active flag is "0" (step S403;N), the packet classifying unit 11 rewrites the active flag to "1" (step S404). Then, the packet classifying unit 11 carries out a process for storing the received packet in the specified queue 12 (step S405). On the contrary, when the active flag is "1" (step S403;Y), the packet classifying unit 11 carries out a process for storing the received packet in the specified queue 12 (step S405) without rewriting the active flag.

Moreover, the packet classifying unit 11, parallel to (independently on) the series of the above described processes, performs a process for managing receiving time of the last received packet for each queue ID the active flag of which is set to "1". Then, the packet classifying unit 11 changes, based on the managing results, the active flag concerning the queue ID of which the receiving time becomes before a time which a predetermined time (such as 60 sec.) is subtracted from a current time to "0".

The scheduling unit 15 performs control to transmitting the packets stored in the queues 12 to the output buffer 13. The scheduling unit 15, when executing this control, refers to values of the flags a_flag in the queue hysteresis table 14, and refers to and updates values of the empty count numbers e_count.

Operations of the router and the scheduling unit 15 in this embodiment will hereinafter be described specifically.

Figure 5:
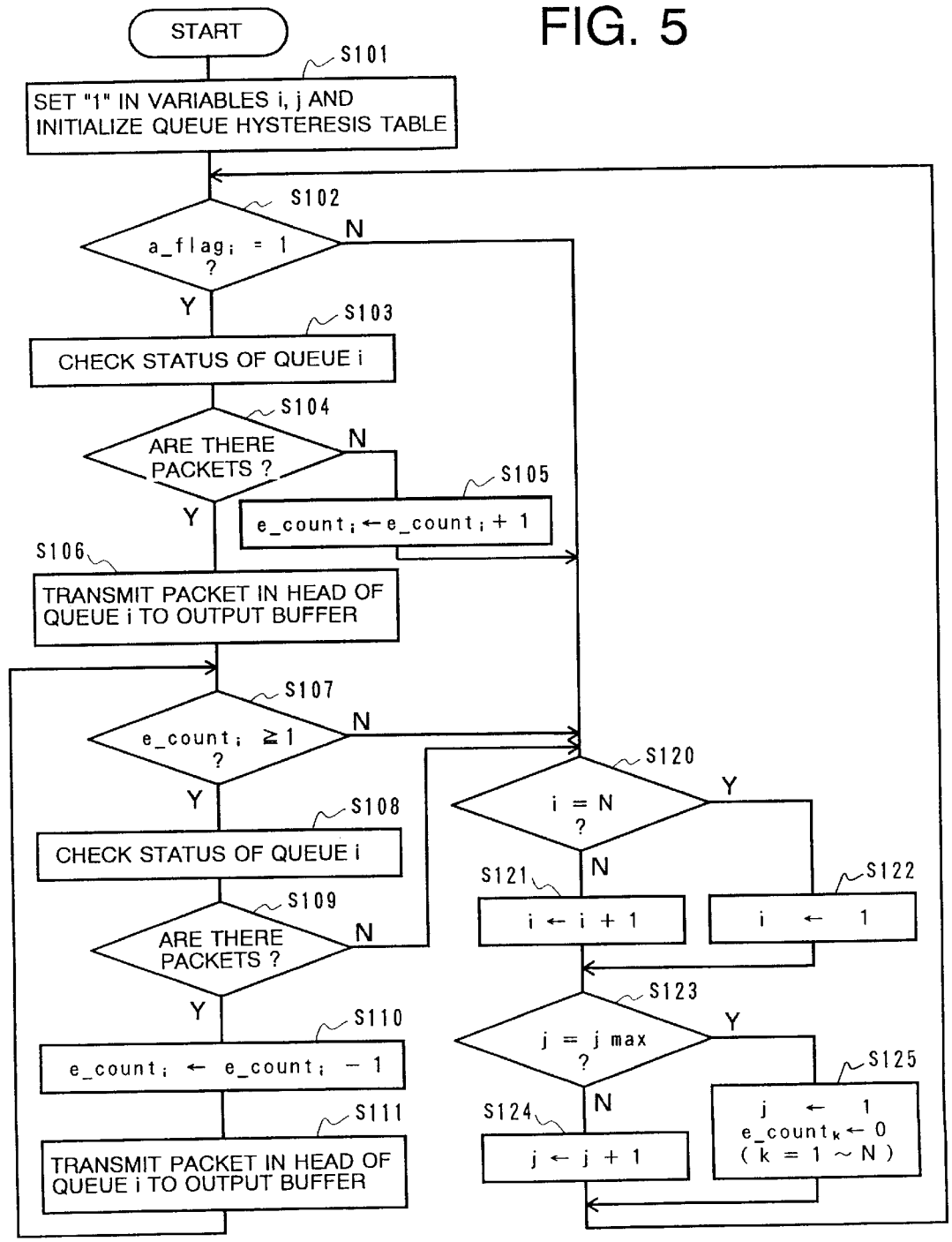
FIG. 5 is a flowchart showing operation procedures of a scheduling unit provided in the router in the first embodiment.

FIG. 5 is a flowchart showing operation procedures of the scheduling unit 15 after starting up the router. As shown in FIG. 5, the scheduling unit 15, when actuating this router, to begin with, sets "1" in variables i and j respectively, and initializes the contents of the queue hysteresis table 14 (step S101). In step S101, the scheduling unit 15 sets "0" in all of the flags a_flag and of the empty count numbers e_count, thereby initializing the queue hysteresis table 14. Moreover, the packet classifying unit 11, after the scheduling unit 15 has executed step S101, starts executing the above-mentioned processes (of supplying the respective queues with the packets and updating the values of a_flag in the queue hysteresis table 14).

After initializing the queue hysteresis table 14, the scheduling unit 15 judges whether an active flag a_flag$_i$ of the queue the queue ID of which is i, is "1" or not (step S102). If a_flag is not "1", (step S102; N), the scheduling unit 15 executes a process (steps S120–S122) for setting the queue ID of the next queue in the variable i. That is, the scheduling unit 15 compares the value of the variable i with a maximum value N of the queue ID and, if the value of the variable i is not coincident with N (step S120; N), adds "1" to the variable i (step S121). Whereas if i is coincident with N (step S120; Y), the scheduling unit 15 sets "1" in the variable i (step S122).

After setting the new value in the variable i in such procedures, the scheduling unit 15 judges whether or not a value of the variable j is coincident with a predetermined value $j_{max}$ (step S123). Then, if the value of j is different from $j_{max}$ (step S123; N), the scheduling unit 15 adds "1" to the variable j (step S124) and returns to step S102. Whereas if the value of j is coincident with $j_{max}$ (step S123; Y), the scheduling unit 15 sets "1" in the variable j and also "0" in all the empty count numbers e_count in the queue hysteresis table 14 (step S125), and then returns to step S102. The reason for executing steps S123–S125 will be elucidated later on.

As described above, if $a\_flag_i$ is not "1", the scheduling unit 15 only changes the values of the variables i, j (and of e_count).

While on the other hand, if $a\_flag_i$ is "1" (step S102; Y), i.e., if the queue i determined to be active by the packet classifying unit 11 becomes a target, the scheduling unit 15 executes the following processes on the queue i and the queue hysteresis table 14 as well.

At first, the scheduling unit 15 checks a status of the queue i (step S103) and judges whether or not the queue i is stored with the packets (step S104). If not stored with the packets (step S104; N), the scheduling unit 15 adds "1" to the empty count numbers $e\_count_i$ pertaining to the queue i within the queue hysteresis table 14 (step S105). Then, the scheduling unit 15 returns to step S102 after changing the value of the variable i and executing other processes (steps S120–S125).

That is, the scheduling unit 15, if no packets to be fetched exist in the processing target queue, launches into processing of the next queue after counting up the empty count numbers e_count corresponding to the above queue.

Whereas if the queue i is stored with the packets (step S104; Y), the scheduling unit 15 transmits, to the output buffer 13, the head packet among those stored in the queue i (step S106). Thereafter, the scheduling unit 15 judges whether or not the empty count number $e\_count_i$ relative to the above queue in the queue hysteresis table 14 is "1" or more (step S107).

If the empty count number $e\_count_i$ is "1" or more (step S107; Y), the scheduling unit 15 again checks the status of the queue i (step S108). The scheduling unit 15, if the queue i is stored with the packets (step S109; Y), decrements the value of the $e\_count_i$ by "1" in the queue hysteresis table 14 (step S110) and transmits the head packet of those stored in the queue i to the output buffer 13 (step S111), and then returns to step S107.

The scheduling unit 15, when detecting an establishment of a relationship of $e\_count_i=0$ (step S107; N) and detecting that the queue i is not stored with the packets (step S109; N), terminates a loop of steps S107–S111. Then, the scheduling unit 15 returns to step S102 after changing the value of the variable i and executing other processes (steps S120–S125), and starts the processing of the next queue.

That is, the scheduling unit 15, if the queue i with $e\_count_i$ being "0" is stored with the packets, fetches only one packet out of the queue i in step S106 and thereafter starts the processing of the next queue. While on the other hand, if the queue i with $e\_count_i$ being "1" or greater is stored with the packets, the scheduling unit 15 fetches only one packet by executing step S106 and thereafter further fetches some packets out of the queue i by repeating the loop of steps S107–S111. Subsequently, the scheduling unit 15, when no packets to be fetched exist in the queues i or when e_count becomes "0", starts the process relative to the next queue (transmitting terminal).

Then, if j coincides with jmax (step S123; Y) during repetitions of the above processes for the respective queues, "0" is set in the value of each empty count number e_count so that the old hysteresis is not referred to more than needed (step S125).

Thus, the scheduling unit 15 controls the number of packets that are read from the queue i so that $e\_count_i$ approximates "0" while setting the data (the value obtained by subtracting the number of packets actually read out of the queue i from the number of times with which the queue i becomes the target) about the using hysteresis of the queue i. That is, the scheduling unit 15 controls the number of packets that are read from each of the queues to uniformize the number of packets per transmitting terminal. Therefore, it follows that the respective transmitting terminals are treated more impartially owing to the present router than by the prior art routers using the fair queuing method. Further, if the packets are transmitted burstwise, it follows that the packets the number of which corresponds to the value of e_count counted before receiving the first packet, are consecutively transmitted, and hence the packets are to be transmitted without any decline in terms of a burstwise property according to the present router.

Figure 6:
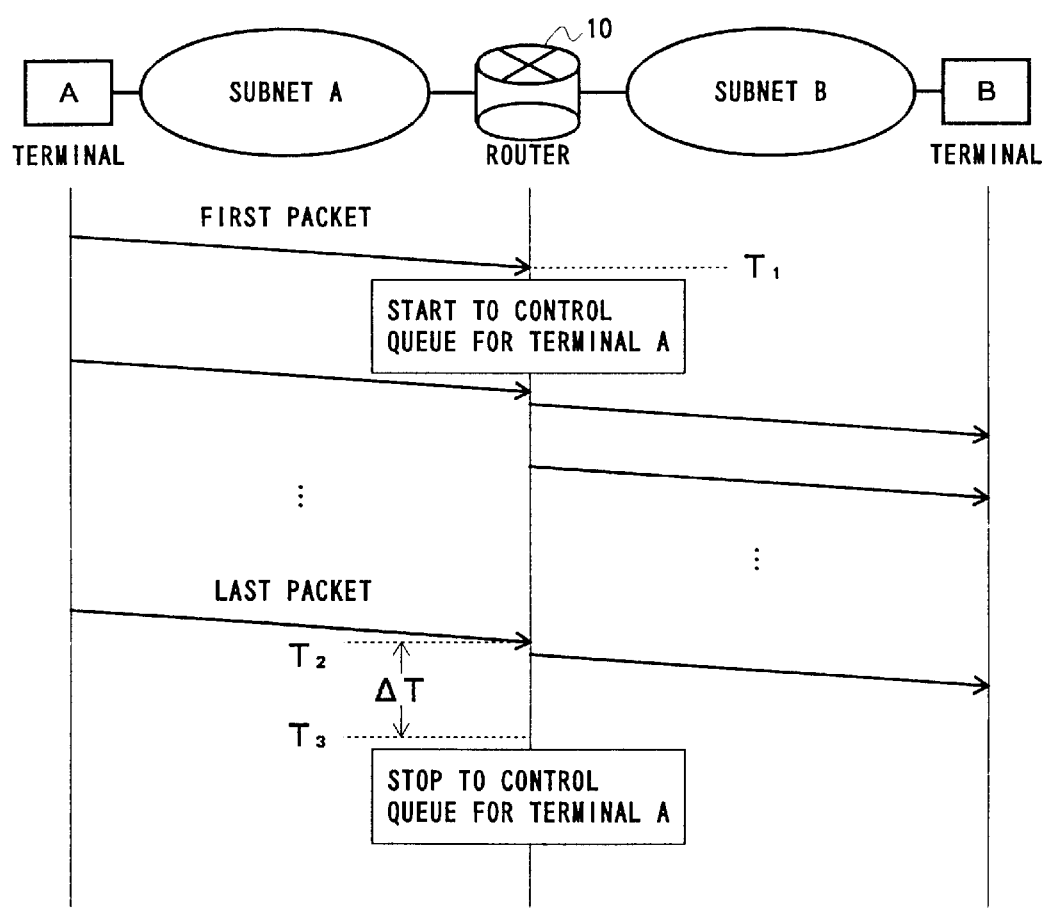
FIG. 6 is a communication sequence diagram of assistance in explaining the operation procedures of a scheduling unit provided in the router in the first embodiment.

Moreover, as shown in FIG. 6, in the present router, it is limited that the queue 12 corresponded to a transmitting terminal (the terminal A in FIG. 6) becomes a check target of the scheduling unit 15 between the time T1 which the first packet from the transmitting terminal A is received and the time T3 which a constant time ΔT is added to the time T2 that the final packet from the transmitting terminal A is received. That is, the present router 10 is provided with the scheduling unit 15 designed not so as to check the queue 12 of which the packet is not stored, so that the present router 10 can also be operate at a high speed.

Variant Forms

The scheduling unit 15 may take a variety of forms.

For instance, the judgement in step S102 may not be made. To be specific, the scheduling unit 15 can be also constructed to execute step S103 next to step S101 or S125. Alternatively, the scheduling unit 15 may be constructed to count up the empty count number $e\_count_i$ in step S105 as far as $e\_count_i$ is less than the predetermined value.

Moreover, the scheduling unit 15 may also be constructed to control the number of packets (the number of executions in step S111) that are fetched extra from the respective queues so that a total number of packets to be taken out of the individual queues during one cycle of the processes for the respective queues, does not exceed a total number of queues.

The control described above can be actualized as below by, e.g., changing the operation procedures of the scheduling unit 15. To start with, just before step S102, if the value of i is coincident with the initial value, the number of queues stored with no packets is counted up, and there is added a step of storing a certain variable (e.g., CV) with a count value thereof. Further, in step S110, a process of subtracting "1" out of CV is executed together with the process for $e\_count_i$. Subsequently, in step S107, if CV is "1" or greater, and if $e\_count_i$ is "1" or above, the processing branches off toward a Y-side but toward an N-side in cases exclusive of the former.

Further, the router as a whole can take a variety of forms. For instance, the router can be modified in such a form that allocations to the respective queues can be done based on the data (a receiving terminal address, and a pair of transmitting and receiving terminal addresses) exclusive of the transmitting terminal address.

Detailed Configuration of Router in First Embodiment

Figure 7:
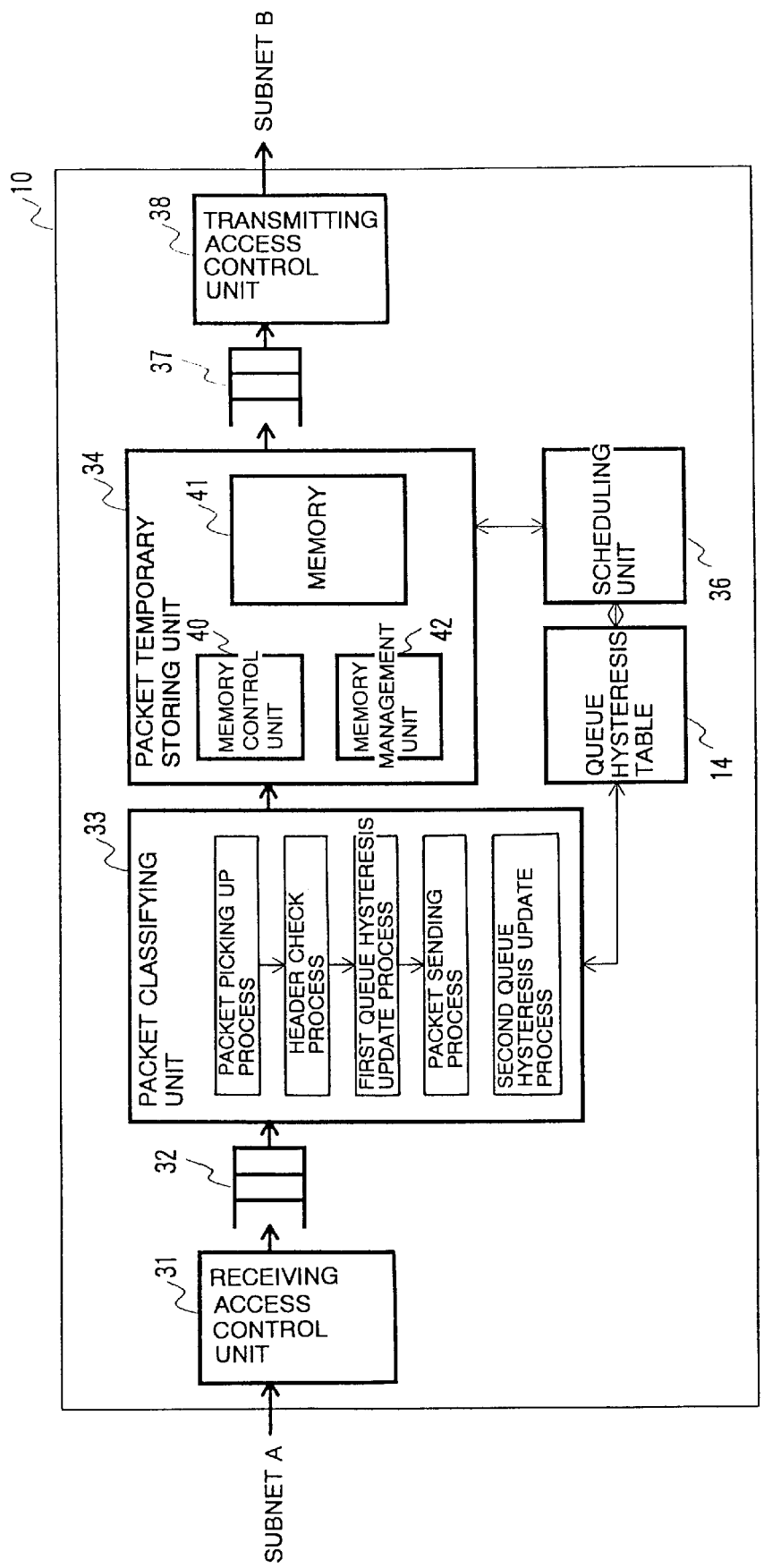
FIG. 7 is a block diagram showing a configuration of the router in the first embodiment of the present invention.

FIG. 7 illustrates a more detailed configuration of the router 10 in the first embodiment. As shown in FIG. 7, the practical router 10 includes a receiving access control unit 31, a receiving buffer 32, a packet classifying unit 33, a packet temporary storing unit 34, a queue hysteresis table 14, a scheduling unit 36, a transmitting buffer 37 and a transmitting access control unit 38.

The receiving access control unit 31 is a unit that controls a data link layer. The receiving access control unit 31 receives a packet to the self-node from the subnet A and stores the received packet in the receiving buffer 32.

The packet classifying unit 33, as shown in FIG. 7, is capable of performing a packet picking up process, a header check process, a first queue hysteresis update process, a packet sending process and a second queue hysteresis update process. In the packet picking up process, the head packet in the receiving buffer 32 is picked up. In the header check process, the header, of which the packet picked up in the packet picking up process, is checked and a queue ID for the packet is determined. Concretely, in the header check process, first, a transmitting address included in the header of the packet (see FIG. 2) is read. Then, the queue ID is specified with the transmitting terminal address by retrieving the address-queue ID table in which data for matching the transmitting terminal address and the queue ID stored in the packet classifying unit 33.

After specifying the queue ID, in the packet classifying unit 33, the first hysteresis update process is performed for updating the data in the queue hysteresis table 15.

The packet classifying unit 33 through the first queue hysteresis process, when an active flag in a record concerning the queue ID determined in the header check process is "0", rewrites the active flag in the record to "1" and finishes the first queue hysteresis process. On the contrary, when the active flag is "1", the packet classifying unit 33 finishes the first queue hysteresis process without rewriting contents in the queue hysteresis table. After finishing the first queue hysteresis process, the packet classifying unit 33 performs the packet transmitting process in which the packet picked up in the packet picking up process is transmitted to the packet temporary storing unit 34 together with the queue ID determined in the header check process.

Moreover, the packet classifying unit 33, parallel to (independently on) the series of the above described processes, performs the second queue hysteresis update process for updating contents in the queue hysteresis table 14 as well as the first hysteresis update process. In the second queue hysteresis update process, a receiving time of the last received packet is managed for each queue ID which "1" is set to the active flag. Then, the active flag, in the record concerning the queue ID of which the receiving time becomes before a time which a predetermined time (such as 60 sec.) is subtracted from a current time, is changed to "0" based on the managed contents.

That is, the packet classifying unit 11 shown in FIG. 1 has the functions of the receiving access control unit 31, the receiving buffer 32 and the packet classifying unit 11. Moreover, the packet classifying unit 11 also has a part of the function of the packet temporary storing unit 34 described in the following.

The packet temporary storing unit 34 is provided with a memory control unit 40, a memory 41 and a memory management unit 42. The memory 41 is used for temporarily storing the packets supplied from the packet classifying unit 33. The memory management unit 40 stores data for managing vacant areas in the memory 41, data for matching each area (in which packet is stored) except for the vacant areas with a queue ID and sequential data for sequencing the area matched with the same queue ID. The memory control unit 40 receives the packet and the queue ID from the packet classifying unit 33. Then, the memory control unit 40 stores the received packet in the area of the memory 41, which is determined based on the data stored in the memory management unit 42. Thereafter, the memory control unit 40 updates the sequential data in the memory management unit 42 in a manner that the last stored packet is matched to the received queue ID so as to be picked up next to the packets stored previously.

Note that, the data in the memory management unit 42 are referred and updated by the scheduling unit 36 as described later.

As above described, the packet temporary storing unit 34 is designed in a manner that packets can be stored so as to read the last stored packet concerning a queue ID by specifying the queue ID. The queue 12 shown in FIG. 1 is designed with the packet temporary storing unit 34.

The transmitting buffer 37 and the transmitting access control unit 38 are provided between the packet temporary storing unit 34 and the subnet B. The transmitting access control unit 37 controls a data link layer to the subnet B. The transmitting access control unit 37 picks up the packets stored in the transmitting buffer 38 sequentially, and transmits them to the subnet B. The output buffer 13 shown in FIG. 1 has functions of these units.

And, the scheduling unit 36 is provided in the scheduling unit 36 as an unit controlling to supply the packets stored in the packet temporary storing unit 34 (the memory 41). The scheduling unit 36 operates basically in accordance with the same procedure as the operation procedure of the scheduling unit 15 shown in FIG. 5. In FIG. 5, not shown, when the status of the queue 12 is checked and the packet is picked up (steps S103, S106, S108), the scheduling unit 36 accesses the scheduling unit 36 to obtain information concerning the storage positions of the packets. For instance, when the status of the queue i is checked, the record, of which the queue ID is i, is retrieved. And, when the head packet concerning the queue i is picked up, the memory management unit 31 is accessed, whereby the data concerning the memory area of the last stored packet (namely, address) is obtained among the packets matched with the queue of which the content. Then, the memory 31 is controlled with the address to thereby pick up the packet. Moreover, it is reflected to the data in the memory management unit 32 that the packet is picked up, and the picking up of the packet is finished.

Second Embodiment

The router in the first embodiment is constructed such that the value of each empty count number e_count is periodically reset to "0" so that the old hysteresis does not reflect in the number of packets read from the respective queues more than required. In contrast with this, the router in accordance with a second embodiment is constructed to perform control different from the above so that the old hysteresis does not reflect in the number of packets read from the respective queues more than needed.

The router in the second embodiment is a modified version of the router in the first embodiment and includes, as in the case of the router (see FIG. 1) in the first embodiment, the packet classifying unit, the plurality of queues, the output buffer, the queue hysteresis table and the scheduling unit. However, the structure of the queue hysteresis table and the operation contents of the scheduling unit are different from those in the router in the first embodiment.

FIG. 8 shows a structure of the queue hysteresis table included in the router in the second embodiment. As shown in FIG. 8, the queue hysteresis table is stored with $C_1$, $C_2$ defined as data for calculating an initial value of the empty count number in addition to the active flag (a_flag) and the empty count number (e_count).

Figure 9:
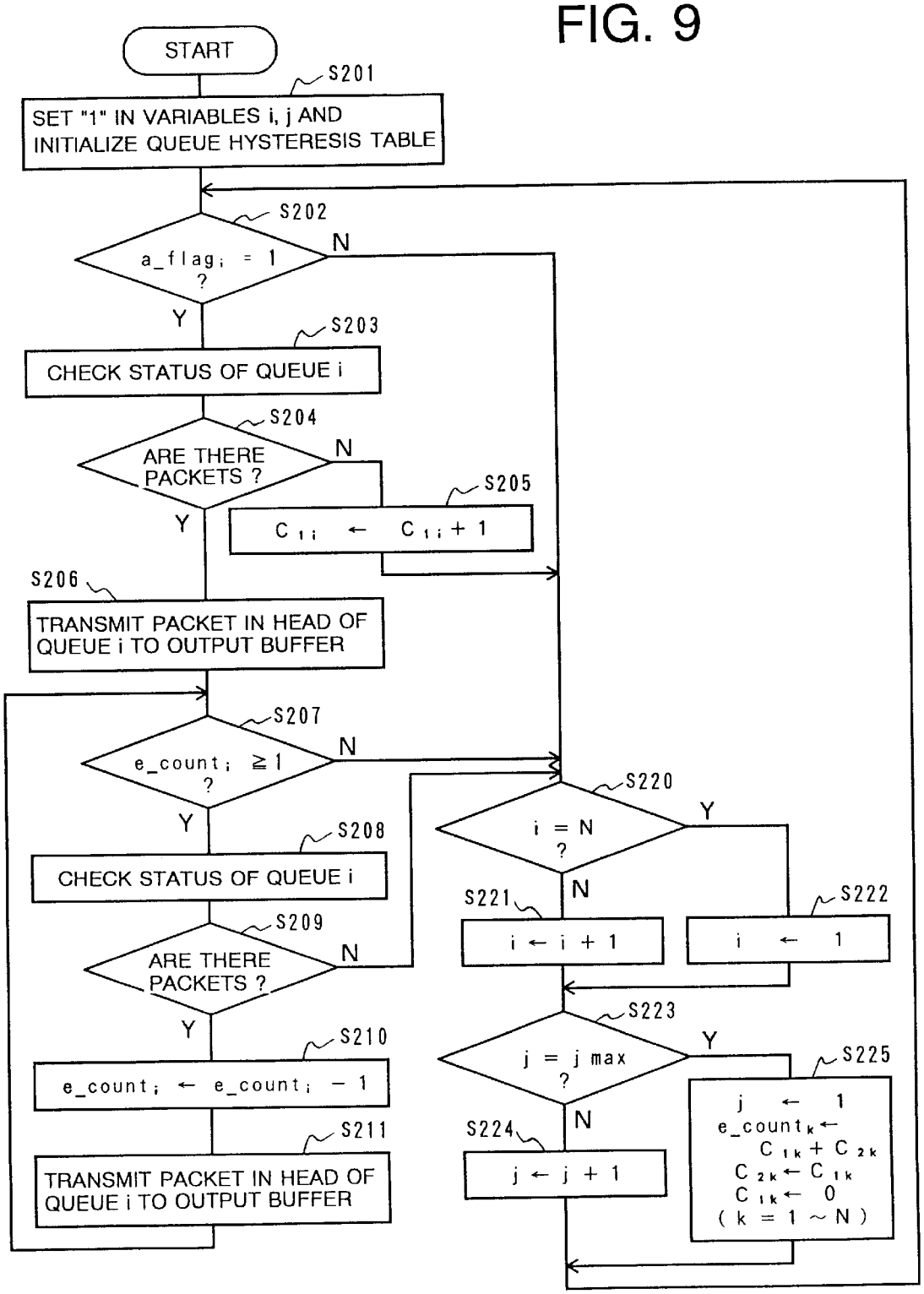
FIG. 9 is a flowchart showing operation procedures of the scheduling unit provided in the router in the second embodiment.

Given hereinbelow is an explanation of the operation procedures of the scheduling unit and the router in the second embodiment. The operation procedures of the scheduling unit in the second embodiment illustrated in FIG. 9 are procedures into which some of the operation procedures (FIG. 5) of the scheduling unit in the first embodiment are changed, and therefore only steps having different operation contents are herein explained.

When starting up the present router, the scheduling unit at first sets "1" in the variables i and j and also sets "0" in all of a_flag, e_count, $C_1$ and $C_2$, thereby initializing the queue hysteresis table (step S201).

Thereafter, the scheduling unit, as in the same way with the scheduling unit 15 in the first embodiment, performs the branch-off corresponding to the value of a_flag updated by the packet classifying unit (step S202). Then, when detecting that the queue i is stored with no packets (step S202; N) as a result of checking initially a status of the queue i (step S203), the scheduling unit adds "1" to $C_{1i}$ (step S205).

The scheduling unit repeats a process of counting up $C_{1i}$ of each variable i till "j=jmax" is established, or a process of transmitting the packets within the queue i to the output buffer. Subsequently, when "j=jmax" is established (step S223; Y), "1" is set in the variable j, and executes a process of setting, in e_count$_k$, a value obtained by adding $C_{1k}$ and $C_{2k}$ with respect to each k of 1 through N, a process of setting a value of $C_{1k}$ in $C_{2k}$, and also a process of setting "0" in $C_{1k}$ (step S225).

That is, the scheduling unit goes on storing the variable $C_1$ with the number of times with which no packets exist in each queue when this queue becomes a target for processing. Then, when j is coincident with jmax, the scheduling unit sets, as an initial value of e_count, a sum of a value of $C_1$ and a value of $C_2$ (which is the value of $C_1$ of the last time). Further, the scheduling unit sets "0" in $C_1$ after setting the value of $C_1$ of this time in $C_2$ to repeat the same processes.

As in the first embodiment, even by use of the scheduling unit working in the manner described above, it is feasible to construct the router by which the respective transmitting terminals are treated more impartially than by the prior art routers using the fair queuing method.

Note that the scheduling unit may be constructed so that the empty count number e_count is counted up together with the count-up of $C_{1i}$ in step S205. Furthermore, for each queue, there may increase the number of variables for storing the number of times with which no packets exist in the queue when this queue becomes the target for processing, and the initial value of e_count may be calculated based on three or more pieces of data.

Reversely, the scheduling unit may also be constructed to set the initial value of e_count without using the variable $C_2$. That is, in step S225, there may be executed a process of setting the value of $C_{1k}$ in e_count$_k$ and a process of setting "0" in $C_{1k}$ for each k of 1 through N.

Third Embodiment

The scheduling unit provided in the router in a third embodiment performs scheduling in consideration of a packet size. A large proportion of the construction and operations of the router in the third embodiment are common to those of the router in the first embodiment, and hence the explanation herein is concentrated on the queue hysteresis table and the scheduling unit which are different in terms of the construction or the operations.

FIG. 10 shows a structure of the queue hysteresis table incorporated into the router in the third embodiment. As shown in FIG. 10, the queue hysteresis table is stored with the active flag a_flag and size data S with respect to each queue ID.

Figure 11:
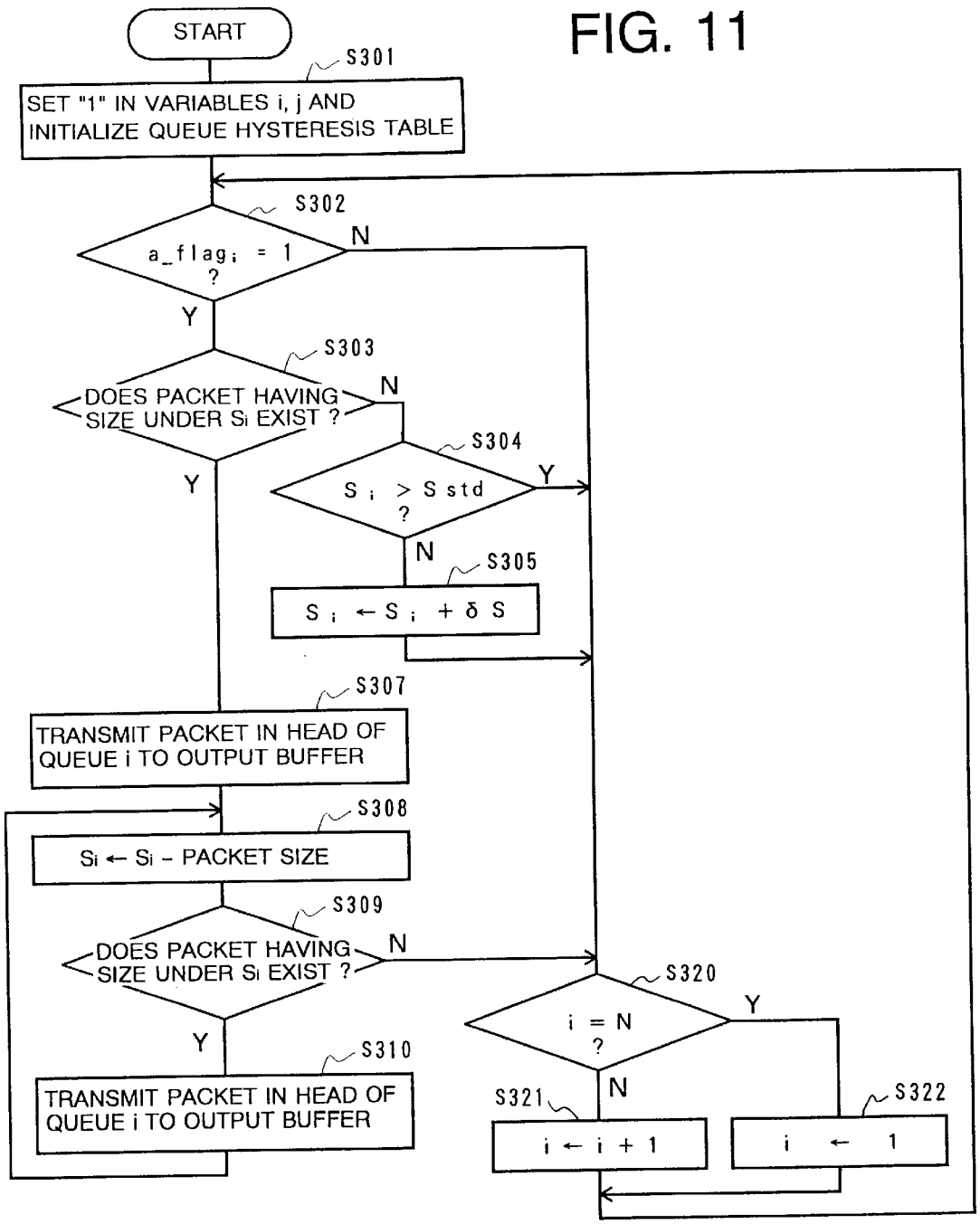
FIG. 11 is a flowchart showing operation procedures of the scheduling unit provided in the router in the third embodiment.
Figure 12:
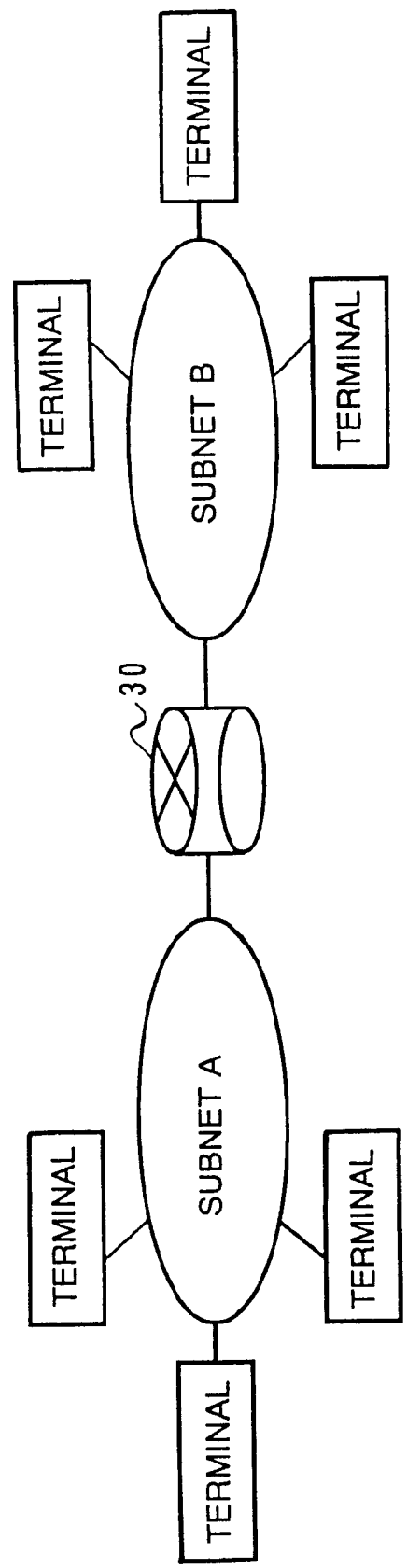
FIG. 12 is a diagram illustrating an example of internet working that uses the router.
Figure 13:
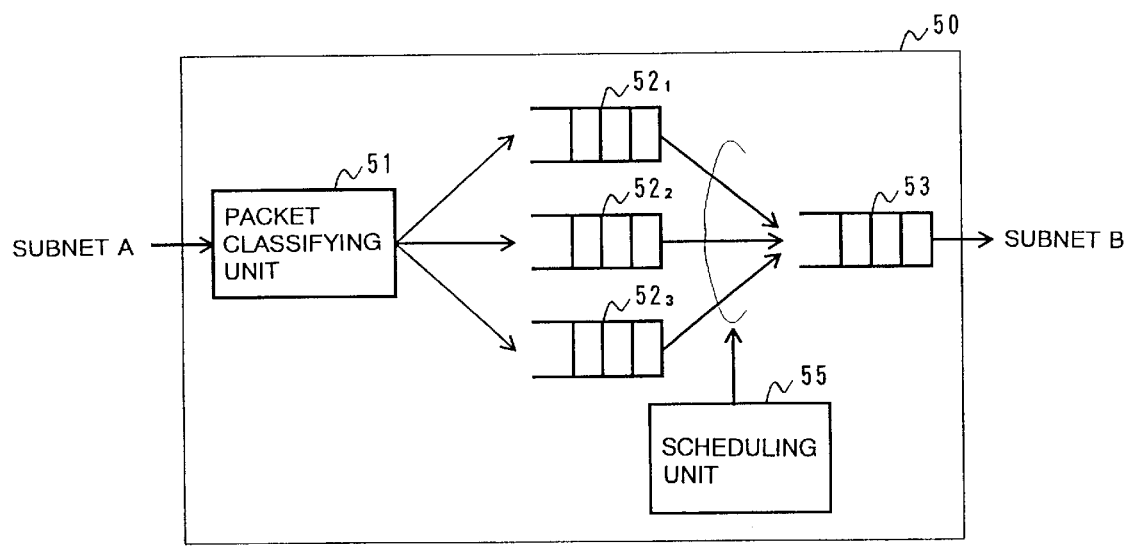
FIG. 13 is a block diagram showing functions of a router employing a prior art fair queuing method.
Figure 14:
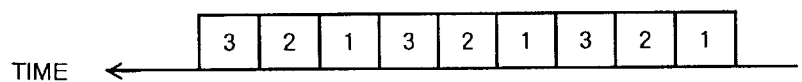
FIG. 14 is an explanatory diagram showing scheduling procedures by the router using the prior art fair queuing method.

The operations of the scheduling unit incorporated into the router in the third embodiment will hereinafter be described with reference to FIG. 11. When starting up the present router, the scheduling unit, to begin with, sets "1" in variables i and j respectively, and initializes the queue hysteresis table 14 by setting "0" in all of a_flag and S within the queue hysteresis table (step S301).

After initializing the queue hysteresis table, the scheduling unit judges whether the active flag a_flag$_i$ of the queue the queue ID of which is i, is "1" or not (step S302). Then, if a_flag$_i$ is not "1", (step S302; N), the scheduling unit executes a process (steps S320–S322) for setting the queue ID of the next queue in the variable i and returns to step S302.

When detecting that a_flag is "1" (step S302; Y), i.e., when the queue i judged to be active by the packet classifying unit becomes a target, the scheduling unit judges whether or not the packets having a size smaller than the side data $S_i$ corresponding to that queue, exists in the head of the queue i (step S303).

If the queue in is stored with no packets, and if the size of the packets stored therein exceeds $S_i$ (step S303; N), the scheduling unit judges whether or not $S_i$ is larger than $S_{std}$ defined as a fiducial value for the size data (step S304). Then, if $S_i$ is under $S^{std}$ (step S304; N), a specified value $\delta S$ is added to $S_i$ (step S305), and the scheduling unit proceeds to step S320. While on the other hand, if $S_i$ exceeds $S_{std}$ (step S304; Y), the scheduling unit proceeds to step S320 without changing the value of $S_i$.

If the packet having the size under $S_i$ exists in the head of the queue i (step S303; Y), the scheduling unit transmits the packet in the head of the queue i to the output buffer (step S307). Subsequently, the scheduling unit decrements the value of $S_i$ by the packet size (step S308), and once again judges whether or not the packet having the size under the size data $S_i$ corresponding to the queue i exists in the head of the queue i (step S309).

Then, if the packet having the size under $S_i$ exists in the head of the queue i (step S309; Y), the scheduling unit transmits the packet in the head of the queue i to the output buffer (step S310) and returns to step S308. The scheduling unit, when detecting that the packet having the size under $S_i$ does not exist in the head of the queue i (step S309; N), finishes a loop of steps S308–S310 and proceeds to step S320.

The scheduling unit in the third embodiment may take a variety of forms. For example, the scheduling unit can be constructed to control the number (quantity) of packets that are taken extra out of the respective queues so that a total quantity of sizes of the packets taken out of the respective queues does not exceed a predetermined total quantity during one cycle of the processes for the individual queues.

Further, there may be provided a routine (corresponding to steps S123–S125 in FIG. 5) for resetting $S_i$ to "0" with a predetermined period immediately after steps S221 and S222.

Note that the scheduling apparatus (the scheduling unit plus the queue hysteresis table) according to the present invention has been explained by exemplifying the router in the first through third embodiments. The present invention is, however, applicable to those exclusive of the router. For example, the data stored in each of the queues can be diversified into printer data given from a corresponding data processor or into a command.

As discussed above in detail, according to the scheduling apparatus and the scheduling method of the present invention, the data elements are fetched from the plurality of queues. The data elements are, however fetched in such a form as to take the using hysteresis of each queue into consideration, and therefore the data elements supplied inside to the queues can be treated more impartially.

What is claimed is:

1. A scheduling apparatus for fetching data elements from a plurality of queues for storing inputted data elements, comprising:

storing means for storing read-out number data defined as data for determining an upper limit of the number of the data elements that are read extra from the queue with respect to each of the plurality of queues;

designating means for cyclically designating one of the plurality of queues as a processing target;

judging means for judging whether or not the queue designated by said designating means is stored with the data elements;

adding means for adding "1" to the read-out number data, corresponding to the queue designated by said designating means, in said storing means when said judging means judges that the queue is not stored with the data elements; and data element fetching means for fetching a data element from the queue designated by said designating means when said judging means judges that the queue is stored with the data elements, judging whether or not the read-out number data corresponding to this queue is above 1, and, when the read-out number data is over 1, fetching from the queue the data elements an upper limit number of which is the read-out number data, and further subtracting the number of the fetched data elements from the read-out number data corresponding to that queue.

2. A scheduling apparatus according to claim 1, wherein said adding means adds "1" to the read-out number data as far as the read-out number data takes a value less than a predetermined value.

3. A scheduling apparatus according to claim 1, further comprising:

counting means for counting the number of queues stored with no data elements when said designating means designates a predetermined queue as a processing target; and controlling means for controlling said data element fetching means so that a sum of the numbers of data elements fetched extract from the respective queues till the predetermined queue is again designated by said designating means, does not exceed a count value by said counting means.

4. A scheduling apparatus according to claim 1, wherein said storing means further stores an empty count number used for determining an initial value for the read-out number data with respect to each queue, said adding means adds "1" respectively to the empty count number and the read-out number data, corresponding to the queue designated by said designating means, in said storing means, and said scheduling apparatus further comprises setting means for setting a value of the corresponding empty count number in each piece of read-out number data within said storing means with a predetermined period and setting "0" in each of the empty count numbers.

5. A scheduling apparatus for fetching data elements from a plurality of queues for storing inputted data elements, comprising:

storing means for storing size data with respect to each of the plurality of queues;

designating means for cyclically designating one of the plurality of queues as a processing target;

adding means for adding a specified value to the size data, corresponding to that queue, in said storing means if the queue designated by said designating means is not stored in its head with the data element having a size under the size data, corresponding to the queue, in said storing means; and data element fetching means for, if the queue designated by said designating means is stored in its head with the data element having the size under the size data corresponding to that queue, fetching the same data element, and repeating a process of subtracting a size of the fetched data element from the size data corresponding to that queue till the data elements having the size under the size data come to non-existence in the head of that queue.

6. A scheduling apparatus according to claim 5, wherein said adding means adds the specified value to the size data as far as the size data takes a value less than a predetermined value.

7. A scheduling apparatus according to claim 5, further comprising:

controlling means for controlling said data element fetching means so that a sum of sizes of the data elements fetched after one piece of data element from one queue does not exceed a predetermined value.

8. A scheduling apparatus according to claim 5, wherein said storing means stores second size data used for determining an initial value for the size data with respect to each queue, said adding means adds a specified value respectively to the second size data and the size data, corresponding to the queue designated by said designating means, in said storing means, and said scheduling apparatus further comprises setting means for setting a value of the corresponding second size data in each piece of size data within said storing means with a predetermined period and setting "0" in each piece of the second size data.

9. A scheduling method of fetching data elements from a plurality of queues for storing inputted data elements, comprising:

a step of cyclically designating one of the plurality of queues as a processing target;

a step of adding "1" to read-out number data corresponding to that queue if the relevant queue is not stored with the data elements with respect to each queue designated as the processing target;

a step of fetching a data element from the relevant queue if this queue is stored with the data elements;

a step of judging whether or not the read-out number data of the relevant queue is over "1";

a step of further fetching, from the relevant queue, the read-out number data an upper limit number of which is the read-out number data; and a step of subtracting the number of the fetched data elements from the read-out number data.

10. A scheduling method of fetching data elements from a plurality of queues for storing inputted data elements, comprising:

a step of cyclically designating one of the plurality of queues as a processing target;

a step of adding a specified value to size data corresponding to the relevant queue if the head of this queue is not stored with the data elements having a size under size data corresponding to that queue with respect to each queue designated as the processing target;

a step of fetching, if the data element having the size under the size data corresponding to the relevant queue is stored in the head of that queue, this piece of data element; and a step of repeating a process of subtracting a size of the fetched data element from the size data corresponding to the relevant queue till the data element having the size under the size data comes to non-existence in the head of the relevant queue.

* * * * *